3,397,290
MECHANISM FOR POSITIONING ROLLERS AND TRANSDUCER MEANS RELATIVE TO A FILM STRIP
Henry A. Thomson and Victor J. Witkowski, Denver, Colo., and Philip N. Crawford, Rochester, N.Y., assignors to Eastman Kodak Company, Rochester, N.Y., a corporation of New Jersey
Filed Mar. 8, 1965, Ser. No. 437,387
17 Claims. (Cl. 179—100.2)

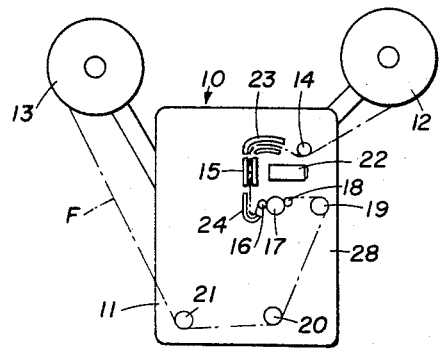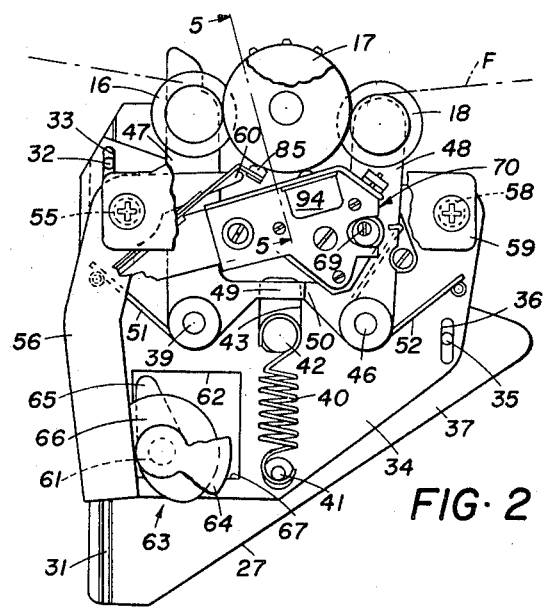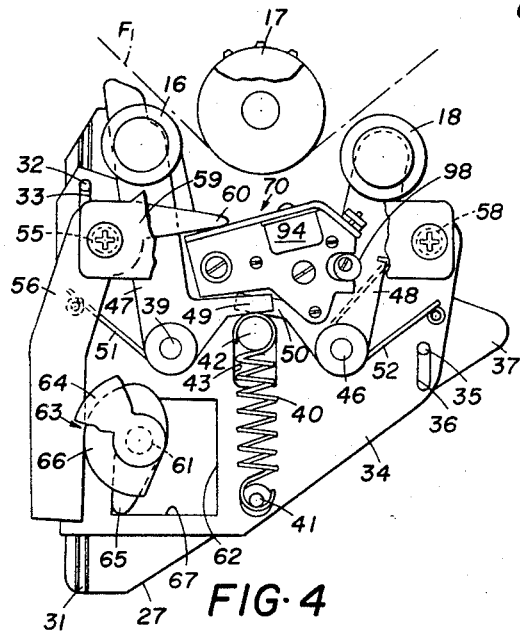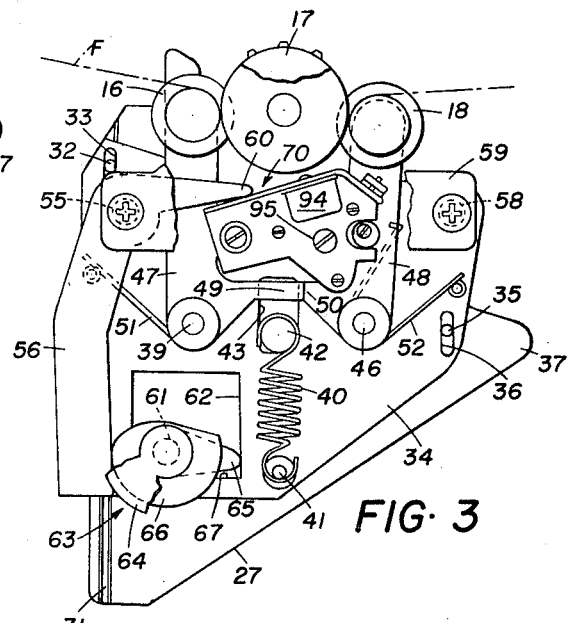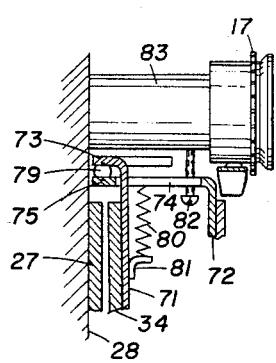
HENRY A. THOMSON
VICTOR J. WITKOWSKI
PHILLIP N. CRAWFORD
INVENTORS
ATTORNEY AND AGENT

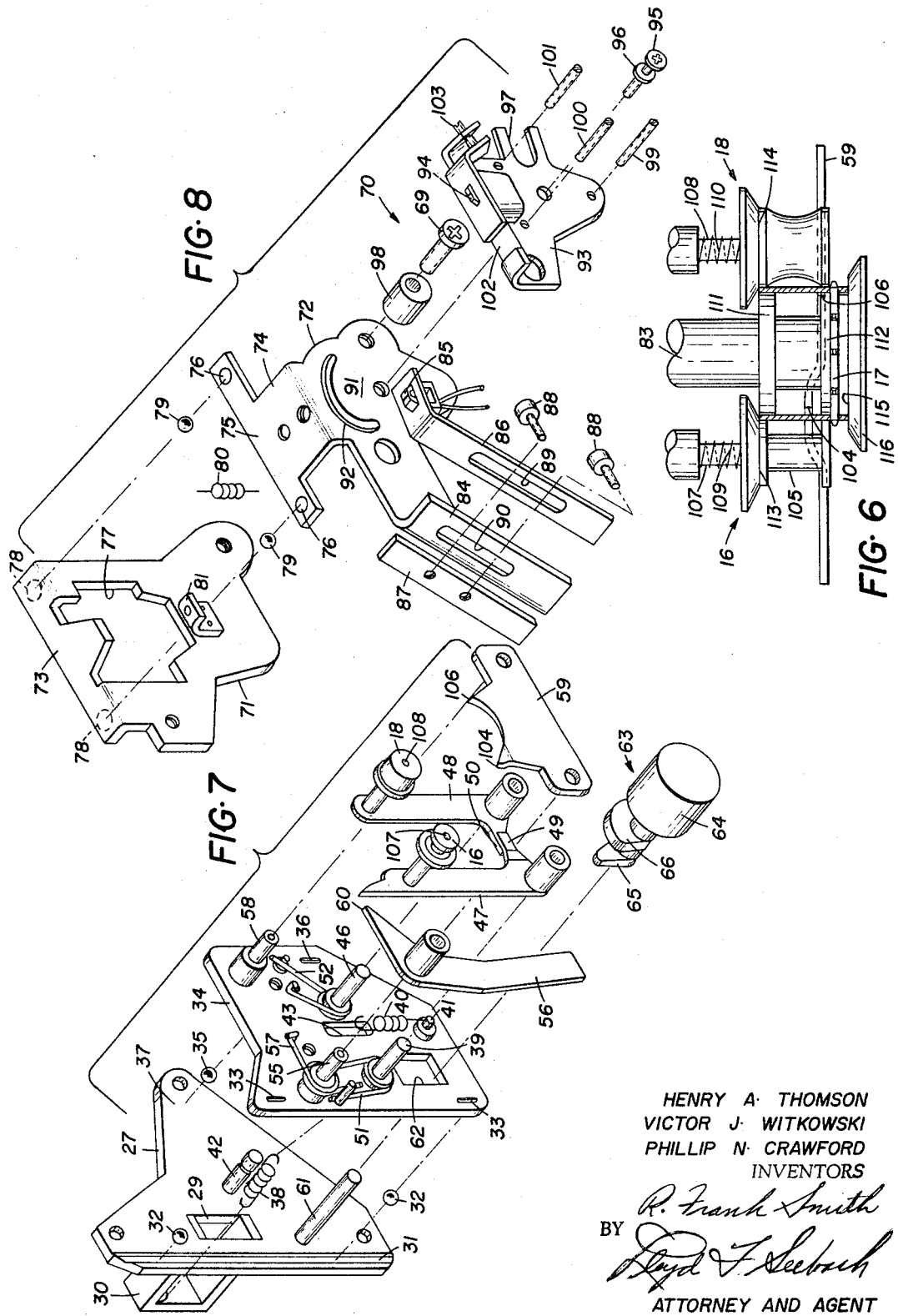

The present invention relates to photographic apparatus and more particularly to a mechanism for use in a projector or a camera for guiding a film strip with or without a sound track around a sprocket and for selectively positioning a transducer assembly relative to the film strip on the sprocket for sound reproduction or silent operation.

In adapting photographic apparatus for projection or taking of motion pictures to the reproduction of sound on a film strip, it is known to provide an auxiliary mechanism including guide rollers and a transducer assembly that can be positioned on a projector or a camera designed for silent operation to convert either to sound reproduction and/or recording. Such a mechanism is usually positioned either ahead of or beyond the film gate and at a distance such that any flutter due to the intermittent movement of the film strip at the film gate is no longer prevalent at the pick up or recording point. This linear distance between the image frame in the film gate and the position of the record/play head will also vary with 8 mm. and 16 mm. film. In a projector or a camera that is so adapted for sound and/or silent operation, two threading paths are usually provided in accordance with the type of operation that is to be performed. It is therefore necessary that the film strip be threaded in the proper path in accordance with the type of operation.

It is an object of this invention to provide a new and improved mechanism for controlling sound and silent operation of photographic apparatus which overcomes the above problems.

Another object of this invention is to provide such a mechanism by which an erase head and a record/play head can be positioned as a unit relative to a film strip for selective sound or silent operation.

A further object of the invention is to provide such a mechanism by which a film strip can be guided around a sprocket and held thereagainst and which can be moved to a position for permitting manual threading or removal of the film strip from the sprocket.

A still further object of the invention is to provide such a mechanism which can be positioned relatively close to the film gate of a photographic apparatus and which retains a transducer assembly in engagement with a film strip for achieving high quality sound reproduction.

And yet another object of the invention is to provide such a mechanism for use in a camera or projector which permits selection of sound operation or silent operation with respect to a film strip engaging a sprocket without changing the film path.

Other objects and novel features of the invention will be readily apparent to those skilled in the art by the description which follows.

The above objects have been attained in the present invention by a continuously rotating sprocket that is positioned relatively closed to the film gate with an erase head and a record/play head engaging the film strip on the sprocket for sound reproduction, such that the image-to-sound separation is only about 16 frames in the case of 8 mm. film. The mechanism described in more detail hereinafter includes a pair of pressure rollers that serve to guide the film strip around the sprocket as well as hold the film strip against the sprocket during operation of the apparatus. The erase and record/play heads engage th film strip intermediate the pair of pressure rollers and ar mounted so that they can be disengaged from the film stri when the film strip is being guided around the sprocket o when the film strip is without a sound track, in which case the apparatus is operated for silent operation. The mecha nism also includes means for moving the pressure rollei into a position in which they do not engage the sprocke so that the film strip can be manually threaded around th sprocket or removed therefrom. This mechanism is a integral part of the photographic apparatus and permit either sound or silent operation without addition of a adapter mechanism or changing the film path. Since th sprocket is located relatively close to the film gate, switcl ing from sound to silent operation, or vice versa, can b readily accomplished where a film strip may includ sections with and without a sound track.

Reference is now made to the accompanying drawing wherein like reference numerals and characters designat like parts and wherein:

FIG. 1 is a diagrammatic side elevational view of projector in which the invention has been incorporatec FIG. 2 is a front elevational view with certain par broken away and showing the relationship of various el ments to a rotatable member for sound operation;

FIG. 3 is a side elevational view similar to that show in FIG. 2 in which a transducer assembly is shown in disengaged position relative to the rotatable member fc silent operation;

FIG. 4 is a side elevational view similar to that show in FIG. 2 in which the transducer assembly and a pa of pressure rollers are held in a disengaged position rela tive to the rotatable member for manually threading film strip around or removing it from the rotatabl member;

FIG. 5 is a partial detail view taken substantially alon the line 5—5 in FIG. 2;

FIG. 6 is a detail plan view showing the relationshi between the rotatable member and the pair of pressui rollers;

FIG. 7 is an exploded perspective view showing th relationship of the elements for actuating the pressui rollers and the transducer assembly; and FIG. 8 is an exploded perspective view of the trans ducer assembly.

With reference particularly to FIG. 1, the inventio is disclosed in conjunction with a projector 10 whic comprises a casing 11 on which a supply reel 12 of fih and a take-up reel 13 are mounted in a known manne The film strip F is threaded around a sprocket 14, throug a film gate 15, over a flanged roller 16, around a coi tinuously rotatable member or sprocket 17, and over flanged roller 18. From the latter roller, the film threaded around a group of rollers 19, 20 and 21 to th take-up reel 13. A projection lens system is designated b the numeral 22 and the projector is provided with a coi ventional drive mechanism for intermittently advancin the film strip through the film gate 15. In order to pro vide for automatic threading of the film strip, a separabl guideway 23 can be provided between the sprocket 1 and the film gate 15 as well as a guideway 24 that arranged between the film gate 15 and roller 16.

With reference to FIGS. 2-4 and 7, a support plate 2 is mounted on a wall 28 of projector 10 and is secure thereto by suitable screws or other fastening means. Plat 27 has a shape best seen in FIG. 7 and is provided wit an aperture 29 having a U-shaped member 30 secure thereto and extending through the wall 28. A vertic; groove 31 is formed in the lefthand side of plate 27 an provides a guideway for a pair of balls 32 that are r tained in a pair of spaced slots 33 in a slide plate 34.

third ball 35 is retained in a slot 36 in plate 34 and engages a front surface 37 of plate 27. Support plate 27 and slide plate 34 are maintained in engagement by a spring 38 that has one end secured to the U-shaped member 30 and the other end secured to the rear end of a stud 39 secured in plate 34. By the structure just described, plate 34 can move relative to plate 27 in a vertical direction, the plate 34 being biased into an operating position by a spring 40 that has one end secured to a pin 41 on plate 34 and the other end secured to a stud 42 that is fixed to plate 27 and extends through an elongated slot 43 in plate 34. Stud 39 and a similar stud 46, which is also secured to plate 34, provide pivotal bearings for arms 47 and 48, respectively, on the respective ends of which roller 16 and roller 18 are rotatably mounted. A lug 49 on arm 47 and a similar lug 50 on arm 48 overlie one another, as seen in FIG. 7, and are arranged so as to be in the path of stud 42 when plate 34 is moved relative to plate 27. A spring 51 and a spring 52 are arranged on studs 39 and 46, respectively, to bias their respective arms 47 and 48 toward sprocket 17. A stud 55 is anchored on plate 34 above stud 39 and provides the pivotal bearing for an operating member 56 which is biased in a counterclockwise direction by spring 57. A similar stud 58 is mounted on the opposite side of plate 34 and a guide plate 59 is secured to the ends of studs 55 and 58.

Support plate 27 has a pin 61 secured thereto which extends through an aperture 62 in plate 34 and on which a selection member 63 is rotatably mounted. The selection member comprises a knob 64, a cam 65, which cooperates with the aperture 62 in plate 34 and a cam 66 which engages the lower end of member 56. With cams 65 and 66 in the positions shown in FIG. 2, the rollers 16 and 18 are in engagement with the sprocket 17 and the slide plate 34 is maintained in its operating or uppermost position. When knob 64 is turned in a clockwise direction, as viewed in FIGS. 2–4 and 7, cam 65 merely moves within the aperture 62, but cam 66 moves member 56 in a clockwise direction to move a transducer assembly, generally designated by the numeral 70 and described in detail hereinafter, into a position in which it is disengaged from the film strip on sprocket 17, as shown in FIG. 3. Further movement of the knob 64 in a clockwise direction moves cam 65 against the lowermost surface of aperture 62, thereby moving plate 34 in a downward direction against the action of spring 40. At the same time, the cam 66 holds the transducer assembly in its disengaged position and, in addition, moves it slightly farther away into a position such as that shown in FIG. 4. As plate 34 moves downwardly, arms 47 and 48 are carried therewith and the lugs 49 and 50 engage stud 42 so as to move the arms in opposite directions, thereby disengaging the rollers 16 and 18 from the sprocket 17 until they assume a position such as that shown in FIG. 4. In this latter position, the sprocket 17 is clear of all engaging members and the film strip F can be manually threaded around the sprocket 17 or readily removed therefrom.

The transducer assembly 70 is shown in detail in FIG. 5 and comprises a mounting plate 71 that is secured to slide plate 34 and on which a pivot plate 72 is mounted. The relationship of plates 34, 71 and 72 is best shown in FIG. 5, wherein it will be seen that an end 73 of plate 71 is formed over toward, but clearing, the wall 28. The pivot plate 72 comprises a horizontal extension 74 with an elongated portion 75 that is provided with a pair of spaced conical recesses 76. The extension 74 and portion 75 extend through an aperture 77 in plate 71 and the recesses 76 are aligned with a pair of similar recesses 78 in the underside of end 73. A ball 79 is positioned in each pair of aligned recesses 76, 78 and a compression spring 80 is arranged between extension 74 and a right angle member 81 fixed to or formed from plate 71. Thus, balls 79 effectively form a hinge connection between plates 71 and 72, the relative positions of plate 72 about the hinge axis being adjustable by a set screw 82 which bears against a bearing sleeve 83 for sprocket 17. At the left side of plate 72 an angular extension 84 is formed on which an erase head 85 is adjustably mounted by means of plates 86 and 87 and the screws 88 which pass through the adjusting slots 89 and 90 in the extension 84 and plate 86, respectively. A facing surface 91 of plate 72 is provided with an arcuate recess 92 for a purpose to be described. A bracket 93 carries a record/play head 94 and is pivotally mounted on plate 72 by means of a screw 95 and a spring washer 96 that is arranged between plate 72 and bracket 93. A yoke portion 97 of bracket 93 engages an eccentric 98 that is mounted on the plate 72 by means of a screw 69. Three set screws 99, 100 and 101 threadably engage the bracket 93 with the ends of set screws 100 and 101 engaging the recess 92 and the set screw 99 engaging the surface 91 of plate 72. The record/play head 94 is preferably mounted on a flexible plate 102 which can be adjusted by means of a set screw 103.

When cam 66 moves member 56 in a clockwise direction, a nose 60 on member 56 engages surface 74 of pivot plate 72 and moves the plate as well as the bracket 93 in a clockwise direction about the pivotal axis formed by balls 79, see FIG. 5. Erase head 85 and record/play head 94 are therefore moved as a unit into a position in which they are disengaged from the film strip on sprocket 17, see FIG. 3. When cam 65 moves slide plate 34 into its releasing position, the transducer assembly is moved with the slide plate and the erase head 85 and the record/play head 94 are moved a corresponding distance away from sprocket 17. The shape of cam 66 is such that bracket 93 is maintained in its disengaged position by member 56 as slide plate 34 is moved into its releasing position, see FIG. 4. The increased clearance between sprocket 17, rollers 16 and 18, and transducer assembly 70 facilitates manual threading of the film strip around sprocket 17 as well as removal of the film strip therefrom. Turning knob 64 in a counterclockwise direction, as viewed in FIGS. 2–4, allows slide plate 34 to return to its operating position by the action of spring 40 with subsequent return of member 56 to its disengaged position by the action of spring 57.

From the structure just described it can be readily appreciated that the transducer assembly 70 comprising the erase head 85 and record/play head 94 is mounted on the slide plate 34 in such a position as to engage a longitudinal sound track on the film strip and in accordance with the axial location of such sound track. For the best sound reproduction, it is necessary that the record/play head be properly adjusted in relation to the film on the sprocket 17. Since the transducer assembly is mounted on the slide plate 34, it assumes a position relative to the film strip when the slide plate is in its operating position such as that shown in FIG. 2. In order to adjust the position of the record/play head across the width of the film strip so that it is properly alinged with the sound track, set screws 99, 100 and 101 are turned in the same direction, thereby relieving or increasing the pressure on spring washer 96 so bracket 93 is thus moved toward or away from plate 72. For adjusting the head so that its gap is at right angles to the direction of travel of the magnetic track, set screws 100 and 101 are turned in opposite directions. By adjusting only set screw 99, the head can be adjusted so that the gap is in contact with the sound track throughout its whole length. Adjustment of the tangent point between the head and the film strip so that the head gap is at the point of tangency is obtained by adjustment of the eccentric 98. This structure therefore provides four important adjustments, namely, lateral, azimuth, parallelism and tangency.

The rollers 16 and 18 together with the guide plate 59 are arranged in such a relation to sprocket 17 that they can serve to guide the film strip directed towards sprocket 17 by the lower guideway 24 around the sprocket so that the end can be threaded around the remaining guide rollers and attached to the take-up reel 13. The plate 59 is provided with a nose 104 that is offset axially so that it lies within the recessed portion 105 of roller 16 and between roller 16 and sprocket 17 as well as a nose 106 that lies between sprocket 17 and roller 18, see FIG. 6. The noses 104 and 106 serve to cooperate with their respective rollers to guide and direct the film strip around the sprocket 17 for automatic threading of the film strip. These same elements also serve to hold the film strip against the sprocket 17 and their peripheral configuration is more clearly shown in FIG. 6. It will be noted that rollers 16 and 18 are rotatably mounted on shafts 107 and 108 that are secured to respective arms 47 and 48, each roller being biased toward sprocket 17 by respective springs 109 and 110. Rollers 16 and 18 hold the marginal edges of the film strip against spaced shoulders 111 and 112 on sprocket 17 and also urge the film in an axial direction so that it is held between shoulders 113 and 114 on rollers 16 and 18, respectively, and a shoulder 115 on a plate 116 that is secured to the sprocket, see FIG. 6. Any variation that may occur in the width of the film is compensated for by movement of either or both of rollers 16 and 18 in an axial direction thereby maintaining the sound track in a properly oriented axial position with respect to the erase head 85 and the record/play head 94.

While the invention has been disclosed as embodied in a projector, the same mechanism can be used in a motion picture camera for recording sound on the film strip at the time the latter is being exposed, for exposing the film strip without sound and for manually threading or removing the film strip from the camera. The support plate 27 has been described as a separate element which is mounted on a wall of a projector but it is perfectly feasible to mount slide plate 34 directly on a wall of a projector or a camera by the same structure described above to provide for the same operating conditions without any further modifications of the described mechanism.

The invention has been described in detail with particular reference to a preferred embodiment thereof, but it will be understood that variations and modifications can be affected within the spirit and scope of the invention as described herein above and as defined by the appended claims.

We claim:
1. Photographic apparatus having a continuously rotatable member about which a film strip is adapted to to at least partially wrapped for driving engagement therewith, comprising in combination:
   means mounted on said apparatus adjacent said rotatable member and maintained in a first position for guiding and holding said film strip in driving engagement with said rotatable member, and adapted to be moved into a second position in which said guiding and holding means is disengaged from said film strip so that the latter can be manually threaded around and removed from said rotatable member;
   transducer means pivotally mounted on said guiding and holding means adjacent said rotatable member for engaging said film strip on said rotatable member in sound-transducing relationship with a sound track on said film strip, and adapted to be moved independently of said guiding and holding means into a disengaged position out of such sound-transducing relationship with said film strip; and
   means on said apparatus coupled to said guiding and holding means and to said transducer means and movable from a sound operating position to a silent operating position for moving said transducer means independently of said guiding and holding means into said disengaged position and from said silent operating position to a threading position for moving said guiding and holding means into said second position while holding said transducer means disengaged from said film strip.

2. Photographic apparatus in accordance with claim 1 wherein said guiding and holding means includes a pair of pivotally mounted rollers and a fixed guide plate, said rollers being biased into engagement with said film strip on said rotatable member at opposite sides thereof when said guiding and holding means is in said operating position.

3. Photographic apparatus in accordance with claim 2 wherein said transducer means engages said film strip or said rotatable member intermediate said pair of rollers.

4. Photographic apparatus in accordance with claim 1 wherein said transducer means comprises an erase head and a record/play head pivotally mounted on said guiding and holding means for engaging said film strip on said rotatable member.

5. Photographic apparatus in accordance with claim 4 and including means for orienting the position of said record/play head relative to a sound track on said film strip.

6. Photographic apparatus in accordance with claim 1 wherein said last mentioned means comprises a pair of cams rotatably mounted as a unit on said apparatus and a follower coacting with one of said cams and said transducer mens and said other cam coacting with said guiding and holding means.

7. Photographic apparatus having a continuously rotatable member about which a film strip is adapted to be at least partially wrapped for driving engagement therewith, comprising in combination:
   a slide member mounted on said apparatus adjacent said rotatable member and adapted to be moved from an operating position to a releasing position
   guiding and holding means mounted on said slide member for engaging said film strip at two spaced positions on said rotatable member to hold said film strip in driving engagement with said rotatable member when said slide member is in said operating position and adapted to be moved to a position disengaged from said film strip when said slide member is moved into said releasing position to thereby facilitate manual threading of said film strip about said rotatable member;
   means interconnecting said apparatus and said slide member for resiliently retaining the latter in said operating position;
   transducer means including an erase head and a record/play head pivotally mounted on said slide member as a unit for engaging said film strip on said rotatable member in sound-transducing relationship with a sound track on said film strip when said slide member is in said operating position and adapted to be moved independently of said slide member into a disengaged position out of such sound-transducing relationship with said film strip; and
   selector means coupled to said slide member and said transducer means and movable between a sound operating position and a silent operating position for moving said transducer means independently of said slide member into said disengaged position, and between said silent operating position and a threading position for moving said slide member into said releasing position while holding said transducer means disengaged from said film strip.

8. Photographic apparatus in accordance with claim 7 including means coupled to said record/play head for orienting the latter relative to said sound track on said film strip.

9. Photographic apparatus in accordance with claim 7 wherein said selector means comprises a pair of cams rotatably mounted as a unit on said apparatus and a follower coacting with one of said cams and said transducer means and the other of said cams coacting directly with said slide member.

10. Photographic apparatus in accordance with claim 7 wherein said guiding and holding means comprises a pair f arms pivotally mounted on said slide member, a freely rotatable roller on each of said arms and a guide plate fixed to said slide member, said arms being arranged on opposite sides of said rotatable member and biased toward the latter so that said rollers engage said film strip at spaced peripheral positions on said rotatable member.

11. Photographic apparatus in accordance with claim 0 wherein said arms engage a relatively fixed portion of said apparatus when said slide member is moved into said releasing position for moving said rollers simultaneously into a position in which they are disengaged from said film strip.

12. Photographic apparatus in accordance with claim 0 wherein said erase and record/play heads engage said film strip intermediate said spaced peripheral positions of said rollers.

13. Photographic apparatus having a continuously rotatable sprocket about which a film strip is adapted to be at least partially wrapped for driving engagement therewith, comprising in combination:

a support member fixed to said apparatus adjacent said sprocket;

a slide member mounted on said support member and adapted to be moved from an operating position to a releasing position;

guiding and holding means pivotally mounted on said slide member for engaging said film strip at spaced peripheral positions on said sprocket to hold said film strip in driving engagement with said sprocket when said slide member is in said operating position, and adapted to be moved into a position disengaged from said film strip when said slide member is moved into said releasing position to thereby facilitate manual threading of said film strip about said sprocket;

means coupling said support member to said slide member for resiliently retaining the latter in said operating position;

transducer means including an erase head and a record/play head pivotally mounted on said slide member for engaging said film strip on said sprocket intermediate said peripheral positions of said guiding and holding means in sound-transducing relationship with a sound track on said film strip, and adapted to be moved independently of said guiding and holding means into a disengaged position out of such sound-transducing relationship with said film strip;

an operating member pivotally mounted on said slide member and adapted to be moved into engagement with said transducer means for moving the latter into said disengaged position independently of said slide member; and selector means mounted on said support member and separately coupled to said operating member and to said slide member, said selector means being movable between a sound operating position and a silent operating position for moving said operating member and from said silient operating position to a threading position moving said slide member into said releasing position while holding said transducer means disengaged from said film strip.

14. Photographic apparatus in accordance with claim 13 including means coupled to said transducer means for orienting said record/play head relative to said sound track on said film strip.

15. Photographic apparatus in accordance with claim 13 wherein said selector means comprises a pair of cams rotatably mounted as a unit on said support member, one of said cams coacting with said operating member and the other of said cams coacting with said slide member.

16. Photographic apparatus in accordance with claim 13 wherein said guiding and holding means comprises a pair of levers pivotally mounted on said slide member, a freely rotatable roller mounted on each of said arms, and a guide plate fixed to said slide member, said arms being arranged on opposite sides of said sprocket and biased toward the latter so that said rollers engage said film strip at spaced peripheral positions on said sprocket.

17. Photographic apparatus in accordance with claim 16 wherein said retaining means engages said arms when said slide member is moved into said releasing position for moving said rollers simultaneously into a position in which they are disengaged from said film strip.

References Cited

UNITED STATES PATENTS 3,233,958   2/1966   Kress et al. _____ 179—100.2

BERNARD KONICK, *Primary Examiner.*

J. R. GOUDEAU, *Assistant Examiner.*